United States Patent [19]

Rubenstein et al.

[11] 4,181,611

[45] Jan. 1, 1980

[54] FILTER THERMAL BYPASS VALVE

[75] Inventors: Raymond D. Rubenstein, La Grange Park; Russell E. Janke, Naperville; Charles L. Rescorla, Westmont, all of Ill.

[73] Assignee: International Harvester Company, Chicago, Ill.

[21] Appl. No.: 5,626

[22] Filed: Jan. 22, 1979

[51] Int. Cl.² ............................................. B01C 27/10
[52] U.S. Cl. ................................... 210/149; 137/468; 210/340
[58] Field of Search .............. 210/132, 149, 168, 171, 210/314, 316, 318, 340, 167; 137/468

[56] References Cited
U.S. PATENT DOCUMENTS

| | | | |
|---|---|---|---|
| 2,522,502 | 9/1950 | Clark | 10/149 X |
| 2,729,339 | 1/1956 | McCoy | 210/149 X |
| 3,341,019 | 9/1967 | Florkowski | 210/132 |
| 4,042,505 | 8/1977 | Waggoner | 210/132 |

*Primary Examiner*—John Adee
*Attorney, Agent, or Firm*—Ronald C. Kamp; F. David AuBuchon

[57] ABSTRACT

A filter thermal bypass valve has an opening defining a seat, a thermal actuator including a plunger capable of being forced toward the seat in response to increases in temperature, a spring retainer capable of movement toward and away from the seat, a rod member affixed to the spring retainer and having an enlarged head portion with a valve plate slidable thereon, a first compression spring forces the retainer in contact with the plunger and a second compression spring urges the valve plate against the seat.

4 Claims, 1 Drawing Figure

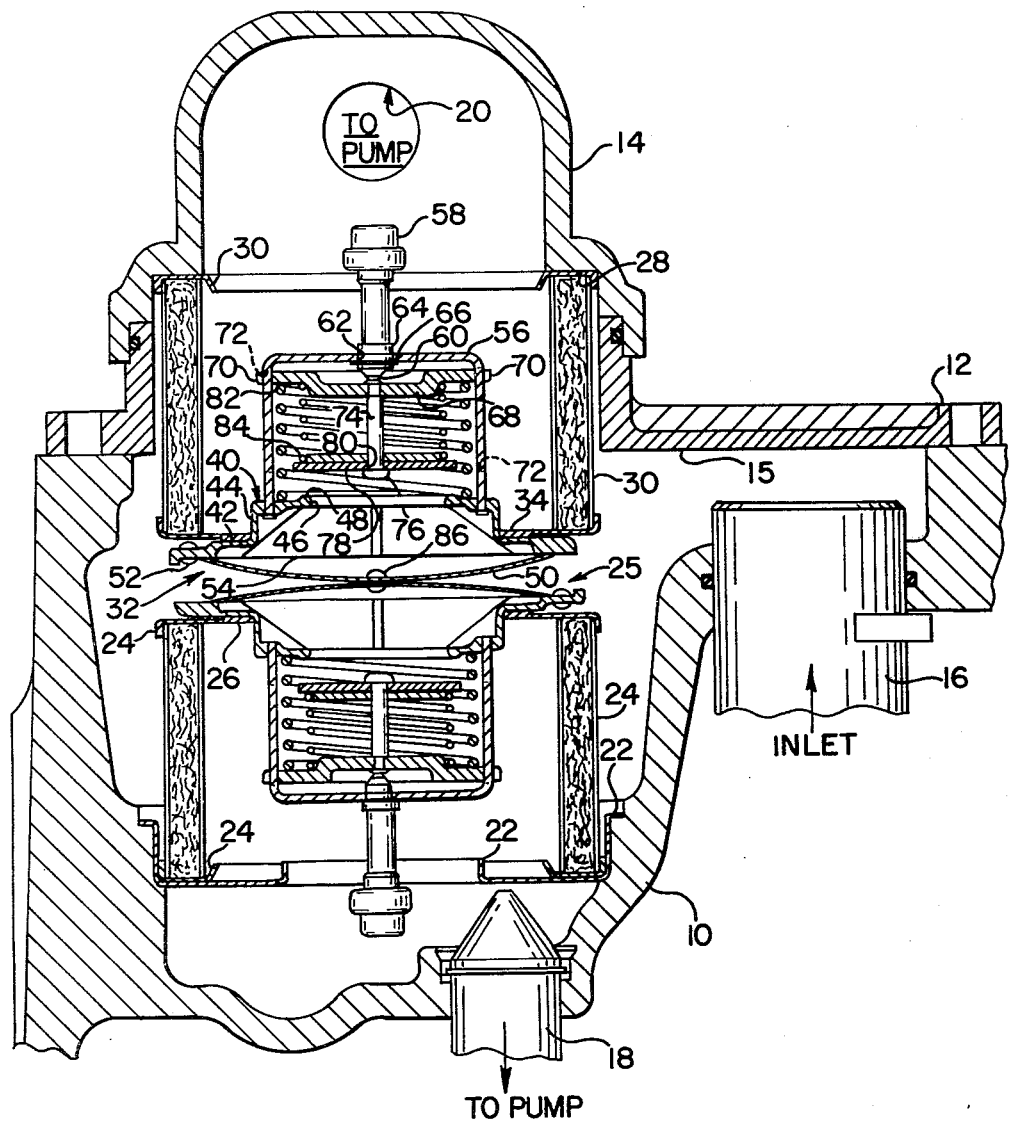

FILTER THERMAL BYPASS VALVE

BACKGROUND AND SUMMARY OF THE INVENTION

In fluid pressure systems, particularly hydraulic systems, it is important to prevent damage to the system components. Filtration of the fluid to remove contaminants therefrom before they reach the critical and expensive component, such as the pump and valves, is recognized as important and has long been accepted practice. However, should the filter element become clogged with contaminants, the pump could become starved for fluid, causing cavitation therein and permanent damage to the pump could result. Even if permanent damage to the pump is avoided in such a case, the flow of fluid from the pump into the hydraulic circuit may be insufficient for consistent and/or predictable operation of the equipment with which the hydraulic circuit is associated. In order to avoid pump damage and insure an adequate volume of fluid under pressure in cases where the filter element becomes clogged, it has been common practice to utilize the pressure differential created by such a clogged filter element to open a valve installed in a path parallel to the fluid filter in order for the fluid to bypass the filter element on its way to the pump. However, another cause of restricted flow through a filter is cold hydraulic fluid since cold oil has a high viscosity and cannot readily pass through the filter. In addition to the filter, the passages through which the fluid must pass also acts as a restriction to fluid flow. Hence, even if a bypass valve is used which is capable of opening in cold fluid conditions, the combined restriction of the passage and the filter, or filter bypass valve, can produce a total pressure drop greater than the pump can safely tolerate damage to the pump and/or producing inconsistent or erratic operation of the associated equipment.

It is, therefore, an object of the present invention to provide a valve which will open in cold fluid conditions without creating a high pressure differential thereacross.

It is also an object of this invention to provide such a valve which will automatically close when the temperature of the fluid reaches a predetermined value necessary for safe, consistent and predictable operation.

It is also an object to provide such a valve which will open when the filter element becomes clogged and restricts flow to the pump.

It is a further object to provide such a valve which has an overtravel mechanism to protect the thermal actuator when fluid temperature goes above the level where the valve has abutted its seat.

It is also an object of the invention to provide such a valve which is compact, which is easily serviced and/or replaceable, which can be stacked or combined in a single outlet in order to provide the advantages thereof to more than one pump while permitting servicing of the filter elments from a single location, and which is economical to manufacture and reliable in use.

These and other objects, and many of the attendant advantages of the present invention, will become more readily apparent upon the perusual of the following description and the accompanying drawings, wherein the sole figure is a cross sectional view illustrating a preferred embodiment of the invention in which a pair of valves are stacked to service two separate pumps.

DESCRIPTION OF A PREFERRED EMBODIMENT

Referring now to the drawing, there is shown a portion of a housing 10 on a vehicle, such as farm tractor, having a cover plate 12 secured to the housing 10. A cap 14 is releasably secured, by means of bolts, not shown, for example, to the cover plate 12. The housing 10, the cover plate 12 and the cap 14 cooperate to form a sealed enclosure indicated at 15. A main suction pipe 16 leads from a reservoir and discharges into the enclosure 15. A first intake line 18 communicates with the enclosure 15 and leads to the inlet of a first pump, not shown. A second intake line 20, located in the enclosure opposite the intake line 18 communicates with the enclosure 15 also. The interior of the housing 10 is machined to permit the insertion, such as by press fit, of a position and seat member 22, which is designed to accommodate the larger opening end of a commercially available filter element 24. A first filter thermal bypass valve unit, indicated generally at 25, is fitted into the smaller opening in the other end 26 of the filter element 24. With the filter 24 and the unit 25 in such a position, it will be necessary for the oil to pass either through the filtering material in filter element 24 or through the bypass valve 25 in order to get from the main suction line 16 to the inlet pipe 18.

The interior of cap 14 is machined to form an annular seat 28, which is designed to accommodate the larger opening end of a commercially available filter element, which is designated by the numeral 30 but which is identical to the filter element 24. A second filter thermal bypass valve, indicated generally at 32, is fitted into the smaller opening end 34 of the filter element 30. The filter element 30 and valve unit 32 thus positioned, hydraulic fluid must flow either through the filtering material in filter element 30 or through the bypass valve 32 in order to get from the main suction line 16 to the pump inlet line 20.

It will thus be seen that the filter element 24 and bypass valve 25 function exclusively with regard to the intake to the pump through intake line 18, while the filter element 30 and bypass valve 32 function exclusively with regard to the intake line 20 and its associated pump. Each of these assemblies are identical, the only difference being that they are reversed with respect to their orientation in the enclosure 15. It will be further appreciated that the filter element enclosure and both filters may readily be changed when they become dirty by simple removal of the cap 14. In order to make the assembly even more convenient, it is possible to attach the element 25 and 32 together, in a manner to be described hereinafter, so that both bypass valve units 25 and 32 may be handled as a single unit. Since each of the bypass valve units are identical, the following detail description with regard to valve element 32 will be sufficient for a complete understanding of the valve unit 25.

The valve unit 32 has a housing 40 including a flange 42 flaring outwardly from a tubular body portion 44. The tubular body portion 44 functions as a convenient guide to facilitate interengagement of the element 30 with the flange 42, the outer diameter of the portion 44 being substantially equal to the opening in the end 34 of the filter element 32. The housing 40 is also provided with a central opening 46 and an upraised seat 48. A spring 50 in a form of an elongate rectangular metal strip, is secured to the housing 40 by means of a rivet 52.

The spring 50 serves to urge the unit 32 into tight engagement with the filter, and the filter into tight engagement with the seat 28 by being pressed into contact with the other unit 25. If the unit were used alone it would be necessary to provide a surface against which the spring 50 could be deflected in order to provide the proper spring load to assure good contact between the unit 32, the filter element 30 and the flange or seat 28 at the opposite end. The spring 50, being thin and bowed outwardly from the unit 32 also functions as a convenient handle for manipulation of the unit. The screen 54 is provided on the housing to remove the larger size contaminants from the fluid when flow is through the bypass valve opening 46. A mounting strap 56 is secured to the housing 40. A thermal actuator 58 including a plunger 60 is secured to the mounting strap 56, such as by trapping the thermal actuator 58 within a bore 62 provided in the mounting strap 56 between a flange 64 formed on the thermal element 58 and a snap ring 66 inserted in a groove formed in the thermal actuator on the side of the mounting strap 56 opposite the flange 64. The element 58 may be any type of device which can translate ambient temperature into a mechanical force, such as that marketed by Eaton Corporation, Controls Division, as a Dole power element, the specific one illustrated in the drawing being a Dole squeeze-push type power element F54-25.

A spring retainer 68 is provided with outwardly extending tabs 70 which extend through slots 72 formed in the mounting strap 56. These tabs 70 serve to guide the spring retainer 68 in its reciprocating movement within the mounting strap 56. A rod member 74 is affixed to the center of the spring retainer 68 is provided with an enlarged head 76 at its free end. A valve plate 78 is provided with a central bore 80 which permits relative movement along the axis of the rod member 74 between the valve plate 78 and the rod member 74. The valve plate is capable of engaging the raised seat 48 on the housing 40 to close off or seal the opening 46. An outer compression spring 82 is trapped between the spring retainer 68 and the housing 40. The function of the spring 82 is to ensure that the spring retainer remains in contact with the plunger 66 and also functions to ensure that the plunger 66 is returned when the thermal material within the actuator 58 contracts upon cooling. In returning the thermal actuator 58 to its reset position when the system cools, the spring 82 also opens the bypass valve. An inner spring 84 is also trapped between the spring retainer 68 and the valve plate 78. This spring which is not as strong as the outer spring 82 functions to permit the valve plate 78 to open whenever a sufficient pressure drop occurs across the valve plate 78 as a result of the filter element 30 becoming clogged.

The thermal actuator 58 contains a special material which expands greatly when heated, the expansion causing the plunger or piston 60 to extend from the actuator body forcing the spring retainer toward the seat 60 until the valve plate or disk 78 contacts the valve seat 48. By providing the bore 80 within the valve disk 78, the rod member 74 may move relative to the valve disk 78. This is important to prevent excessive loading on the thermal actuator since the thermal material continues to expand although perhaps at a slower rate, as the temperature continues to increase. Such continued temperature increas will cause the plunger to continue compressing the inner spring 84 as well as the outer spring 82 while the rod member 74 slides freely through the disk 78. Thus even though there is increased load on the thermal actuator, due to the further compression of both springs, there is some movement available and excessive loads on the thermal actuator are prevented. As the inner spring 84 compresses, the pressure drop across the filter required to open the valve disk 78 against the bias of the inner spring 84 increases and remains correct for the temperature at which the circuit is designed to operate. As the system cools off, the outer spring 82 forces the spring retainer against the plunger or piston 60 and resets the thermal actuator 58 by forcing the plunger 60 back into the thermal actuator body. As the spring retainer 68 moves toward the thermal actuator 58 the enlarged head 76 engages the valve disk 78 opening the bypass valve. When the hydraulic system is then subsequently started or operated in a cold condition the valve disk will already be displaced from the seat 48 permitting flow of the cold and viscous hydraulic fluid through the opening 46 without the necessity of any pressure differential being created in order to open the valve disk 78.

While preferred embodiments of the present invention have been described herein, it will be appreciated that various changes and modifications may be made therein without departing from the spirit of the invention as defined by the scope of the appended claims.

What is claimed is:

1. A thermal and pressure differential valve for a fluid filter comprising:
    a housing adapted to receive a filter element, and having an opening defining a seat;
    a mounting strap strap affixed to said housing;
    a thermal actuator affixed to said strap and having a plunger capable of being forced toward said seat in response to increases in temperatures;
    a spring retainer slidably mounted in said mounting strap and capable of movement toward and away from said seat;
    a rod member affixed to said spring retainer and having an enlarged head portion;
    a valve plate slidably carried on said rod member between said retainer and said head portion;
    a first compression spring trapped between said housing and said retainer for forcing the latter into contact with said plunger;
    a second compression spring trapped between said valve plate and said retainer urging said valve plate against said seat but permitting said valve plate to move away from said seat when a predetermined pressure differential across said valve plate exists.

2. A valve according to claim 1 and further comprising:
    a spring means for forcing said housing into tight engagement with said filter element.

3. In a tractor housing having a central suction line and pair of inlets leading to separate pumps with a pair of facing filter thermal bypass valves mounted in said housing one each between the suction line and one of the pump inlets, each bypass valve having a valve housing adapted to receive a filter element and having an opening defining a seat;
    a mounting strap affixed to said housing;
    a thermal actuator affixed to said strap and having a plunger capable of being forced toward said seat in response to increases in temperature;
    a spring retainer slidably mounted in said mounting strap and capable of movement toward and away from said seat;

a rod member affixed to said spring retainer and having an enlarged head portion;

a valve plate slidably carried on said rod member between said retainer and said head portion;

a first compression spring trapped between said housing and said retainer for forcing the latter into contact with said plunger;

a second impression spring trapped between said valve plate and said retainer urging said plate against said seat but permitting said valve plate to move away from said seat when a predetermined pressure differential across said valve plate exists.

4. In a device according to claim 3 wherein each of said by-pass valves has a leaf spring affixed at one end to the associated valve housing and means securing said leaf springs to each other;

whereby the pair of by-pass valves may be handled as a unit.

* * * * *

UNITED STATES PATENT OFFICE
CERTIFICATE OF CORRECTION

Patent No. 4,181,611   Dated Jan. 1, 1980

Inventor(s) Raymond D. Rubenstein, Russell E. Janke and Charles L. Rescorla

It is certified that error appears in the above-identified patent and that said Letters Patent are hereby corrected as shown below:

In Claim 3, line 22, correct

"a second impression" to read

--a second compression--

Signed and Sealed this

Seventh Day of September 1982

[SEAL]

Attest:

Attesting Officer

GERALD J. MOSSINGHOFF

Commissioner of Patents and Trademarks